United States Patent [19]
Manning

[11] Patent Number: 5,246,772
[45] Date of Patent: Sep. 21, 1993

[54] WETLAID BIOCOMPONENT WEB REINFORCEMENT OF AIRLAID NONWOVENS

[75] Inventor: James H. Manning, Appleton, Wis.

[73] Assignee: James River Corporation of Virginia, Richmond, Va.

[21] Appl. No.: 596,496

[22] Filed: Oct. 12, 1990

[51] Int. Cl.$^5$ .................. D02G 3/00; B32B 27/34; B32B 5/06; B32B 5/22
[52] U.S. Cl. .................. 428/284; 428/286; 428/287; 428/297; 428/298; 428/373
[58] Field of Search ............... 428/284, 286, 287, 297, 428/298, 373

[56] References Cited

U.S. PATENT DOCUMENTS

| | | | |
|---|---|---|---|
| 4,552,603 | 11/1985 | Harris, Jr. et al. | 428/373 |
| 4,634,621 | 6/1987 | Manning et al. | 428/297 |
| 4,636,418 | 1/1987 | Kennard et al. | 428/287 |
| 4,637,949 | 1/1987 | Manning et al. | 428/297 |
| 4,731,276 | 3/1988 | Manning et al. | 428/297 |
| 4,883,707 | 11/1989 | Newkirk | 428/296 |

*Primary Examiner*—George F. Lesmes
*Assistant Examiner*—Kathryne E. Shelborne

[57] ABSTRACT

A flat, cloth-like composite laminate including airlaid, nonwoven pulp web layers reinforced by a wetlaid bicomponent web layer. The bicomponent web layer has a sheath-core configuration, wherein the fiber component of the sheath member has a lower melting point than the fiber component of the core member. If desired, an adhesive material can be utilized between the bicomponent layer and the airlaid pulp web layer.

20 Claims, 3 Drawing Sheets

WETLAID BIOCOMPONENT WEB REINFORCEMENT OF AIRLAID NONWOVENS

BACKGROUND OF THE INVENTION

1. Field of the Invention

The present invention relates to reinforced cloth-like composite laminates of cellulosic fibers.

Airlaid technology is used to form a variety of cellulosic paper products. It is usually desirable that cellulosic composite laminates exhibit a number of qualities such as a cloth-like appearance, excellent wet and dry strength, exceptional porosity, very good abrasion resistance and wash durability, bulk and water holding capacity, and a lack of a paper rattle. Cellulosic composite laminates that possess these qualities can be used to make towels or tissues that are valuable assets in the performance of a variety of tasks. For example, such a towel or tissue can be used by doctors or nurses as a highly effective and strong hand towel or tissue in both a hospital and an office.

Moreover, it is desirable that the wet and dry strength, elongation and breaking strength of the resulting composite laminate be stronger than the sum of the individual layers making up the composite laminate. Such a composite laminate would be very durable and effective in a number of applications.

2. Description of the Background Art

In previous processes and cellulosic composite laminates whereby cellulosic fiber webs are reinforced with a reinforcing nonwoven material or scrim, difficulties have been encountered in achieving an effective bonding between the cellulosic fiber webs and the reinforcing nonwoven material. Such difficulties reduce the overall strength of the composite structure and lead to puckering of the finished fabric. In some cases excessive amounts of latex have been utilized in an attempt to strengthen the bonding between the cellulosic fiber webs and the reinforcing material which, of course, adversely affects the overall cost of manufacture. In this regard, reference is made to U.S. Pat. No. 4,636,418, to Kennard et al, and U.S. Pat. Nos. 4,634,621, 4,637,949, and 4,731,276, all to Manning et al. Each of these references discloses the combination of a reinforcing nonwoven material or scrim provided with cellulosic fiber webs on one or both sides thereof and the bonding thereof with a latex adhesive. In Kennard et al, the latex is used as the only means for joining the layers together, and it is specifically disclosed that the nonwoven material can be bonded and wet formed prior to lamination. In the Manning et al patents, particularly the '621 patent, the reinforcing layer is a scrim that is coated with a thermoplastic binder onto which the cellulosic fiber layers are provided, wherein the scrim and two cellulosic layers are passed through a station to heat the laminate to a temperature sufficient to activate the thermoplastic binder. None of these references, however, disclose the use of a wetlaid bicomponent fiber web as the nonwoven reinforcing web. Moreover, no component portion of the nonwoven fibers of the reinforcing web or scrim are used themselves in order to bond the cellulosic fiber webs to the nonwoven web or scrim.

SUMMARY OF THE INVENTION

The present invention provides a cloth-like composite laminate with a superior balance of properties, such as strength, bulk, cloth-like appearance, abrasion resistance, wash durability, better wiping performance and porosity.

Another feature of the present invention is the provision of a flat and smooth cloth-like composite laminate and method for its manufacture.

The present invention provides a flat, cloth-like, multi-layered composite laminate structure comprising a wetlaid, nonwoven bicomponent fiber web layer and two nonwoven airlaid pulp web layers provided on opposite sides of the bicomponent layer. The layers of the laminate are bonded together by fusion bonding of fibers of the wetlaid layer to fibers of airlaid layers. The fusion bonding is effected by heating the layered structure to soften the bicomponent fibers and thereby bond the layers together. The assembly is embossed.

One or both of the airlaid webs may be treated with a binder.

The bonding may be enhanced, if desired, by additionally employing adhesive, e.g. latex. The latex may be applied between the wetlaid layer and one or both of the airlaid layers.

For example, it may be applied to one or both faces of the wetlaid layer and/or to the face of one or each of the airlaid layers which is intended to contact a face of the wetlaid layer.

In one embodiment, the laminate can be bonded by a combination of prebonding the bicomponent nonwoven web, providing a latex as an adhesive between the bicomponent layer and the airlaid pulp web layers, and hot embossing the laminate by a pattern of point bonds. In another embodiment of the invention, the flat cloth-like composite laminate is obtained by a method for making a flat cloth-like composite laminate comprising the steps of forming the wetlaid nonwoven bicomponent fiber web layer by passing the bicomponent layer over a dryer, for example a Yankee Dryer of a low-speed paper machine whereby the bicomponent fibers can be thermally bonded to one another, introducing the wetlaid bicomponent layer between two nonwoven layers of airlaid pulp webs to form a three component, layered structure, and embossing the layered structure under conditions which cause softening of the bicomponent fiber thereby causing the airlaid pulp web layer to adhere to the bicomponent fiber layer to form said composite laminate.

The two nonwoven layers, between which the bicomponent fiber layer is inserted, can be made by forming two separate layers of the three-dimensional cellulosic fibers, applying a latex binder to each layer, and drying the latex binder to form two separate nonwoven layers of cellulosic fibers.

In addition to the method discussed hereinabove, the cloth-like composite laminate of the present invention may also be formed with the use of adhesives on one or more layers of the airlaid pulp web layer or the combined use of adhesives and embossing.

The resultant laminate of the present invention exhibits an increased strength due to the thermal bonding of the fibers in the bicomponent web and the fusion bonding of the bicomponent nonwoven web to the airlaid pulp fibers, e.g. in a hot embossed pattern. When adhesives are utilized, the prebonding of the bicomponent nonwoven web permits the airlaid pulp fiber webs to be adhered thereto with a much reduced quantity of latex adhesive, thus making a softer and better wiping product while at the same time producing a more economical product. Also, the use of the low-cost bicomponent fiber nonwoven web provides a reinforcement layer which is not water sensitive and eliminates the problem of puckering in the finished product. Furthermore, the cellulosic composite laminates of the present invention exhibit high wet and dry strength properties and exceptional porosity. Towels or tissues made from the composite laminates have a cloth-like appearance and possess excellent abrasion resistance and wash durability. The towels or tissues also lack the noisy paper rattle that is commonly associated with most cellulosic products. By means of the method of the invention, intimate intermingling can be achieved between the bicomponent fibers of the wetland layer and the cellulosic fibers of the airlaid pulp layers whereby the cellulosic fibers become entangled within the holes of the bicomponent web layer to enhance the bond between said layer and the airlaid pulp webs disposed on both sides thereof.

The foregoing and other features and advantages of the present invention will be made more apparent from the following description of the preferred embodiments.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

The method of the present invention can be performed by various apparatus known in the art, such as the apparatus of U.S. Pat. No. 4,292,271 to Buob et. al.

In a method of the invention a flat-cloth-like composite laminate can be manufactured by depositing a first airlaid pulp web onto a wire conveyor belt to form a nonwoven layer, introducing a wetlaid bicomponent fiber, nonwoven web layer onto the airlaid pulp layer, depositing a second airlaid pulp web onto the wetlaid bicomponent fiber, nonwoven web layer to form a three component layered structure, and hot embossing said layered structure, whereby the softening of the bicomponent fiber causes the airlaid pulp web layers to adhere to the bicomponent fiber nonwoven web layers to form the composite laminate. Advantageously, the wetlaid bicomponent fiber, nonwoven layer, e.g. is, prebonded by passing the nonwoven web through a Yankee Dryer of a low speed paper machine. The resultant laminate exhibits increased strength due to the thermal bonding of the fibers in the bicomponent web and the bonding of the nonwoven web to the pulp fibers by way of the hot embossing pattern. If desired, an adhesive can be applied to the airlaid pulp layer or to the bicomponent layer during the formation of the composite structure. Prebonding the nonwoven web permits the airlaid pulp fiber web to be adhered thereto with a much reduced quantity of latex, thus making a softer and better wiping product.

Figure 1:
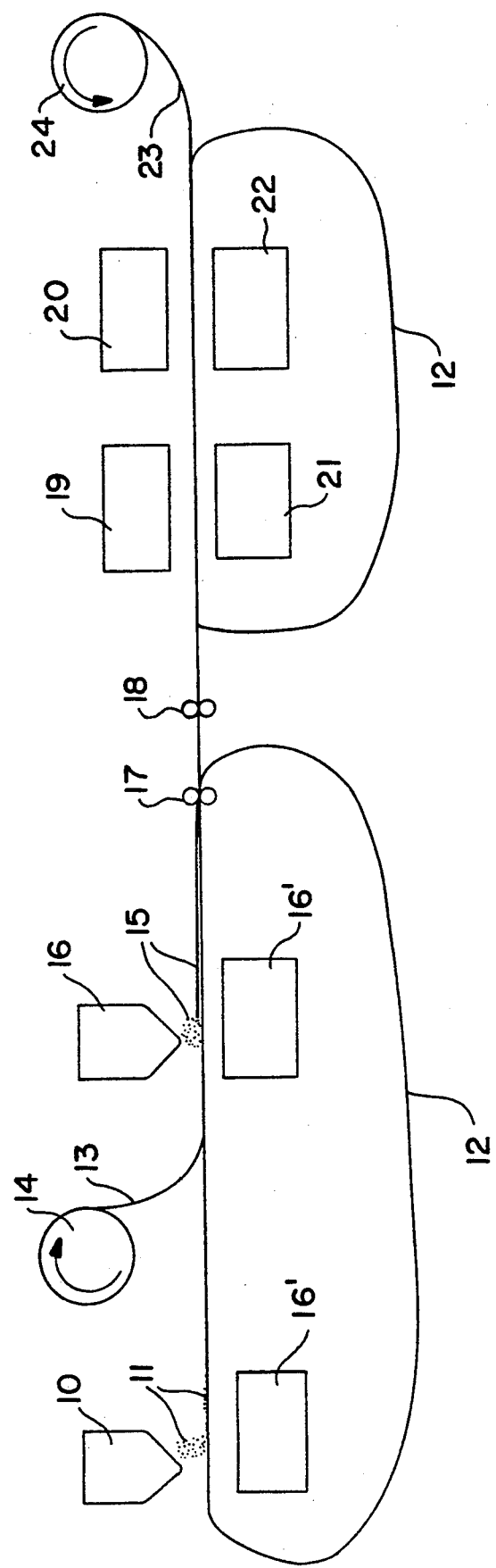
FIG. 1 shows one embodiment of an in-line lamination method and apparatus for forming a a laminate according to the invention from airlaid cellulosic pulp fiber deposited on a conveyor belt.

More specifically, as illustrated in FIG. 1 of the present application, an air laying station 10 is utilized to deposit a cellulosic fiber layer 11 onto a conveyor belt 12. A wetlaid nonwoven bicomponent fiber web 13 which was previously thermally treated on a Yankee Dryer is unwound from a supply roll 14 and deposited on top of the cellulosic fiber layer 11. A second cellulosic fiber layer 15 is dispersed from the air laying station 16 on top of the bicomponent fiber web 13. Suction boxes 16' are disposed below the air laying stations 10 and 16. The composite structure is then advantageously passed through heated rolls 17 to compact and control the caliper of the composite. The heated rolls are effective in rendering the composite self-supporting for conveyance to the embossing station 18 where the process can be completed. In the embossing station 18 the laminate is fed between hot embossing rollers where a hot embossing pattern is applied to the composite laminate to form a completed product with specific properties. If a stronger final product is desired, the embossing station is replaced with heated rolls or calender rolls followed by the further treatment with a latex binder which is applied at latex dispensing station 19 followed by drying at the drying station 20. Vacuum box 21 is utilized to facilitate the penetration of the latex binder into the composite, and vacuum box 22 is utilized to effect the penetration of the drying air into the composite. The completed product 23 can then be stored onto the reel 24. Alternatively, the completed product 23 can be further strengthened by flipping the composite structure, for example, through the use of reversing rollers, and treating the other side of the composite with a latex adhesive followed by drying, similar to stations 19 and 20.

The bicomponent synthetic fibers can be bicomponent fibers such as sheath/core bicomponent fibers wherein there is a lower melting component and a higher melting component, with a significant proportion of the surface of the fiber being the lower melting component. In many cases sheath/core bicomponent fibers are preferred because they exhibit a better bonding efficiency than side-by-side bicomponent fibers, and because in some cases side-by-side bicomponent fibers may exhibit an excessive tendency to curl, crimp, or shrink during the heat bonding step. Both concentric and eccentric sheath/core bicomponent fibers can be used. Typically the fiber component of the sheath and core members are composed of thermoplastic synthetic materials, such as for example, polyolefin/polyester (sheath/core) bicomponent fibers whereby the polyolefin, e.g., polyethylene sheath, has a melting point low enough so that the bicomponent fibers can be bonded to one another by passing the nonwoven web through a Yankee Dryer of a low speed paper machine. The thermally prebonded bicomponent web 13 can then be utilized as indicated in FIG. 1, discussed hereinabove, or collected on a supply roll 24.

Figure 2:
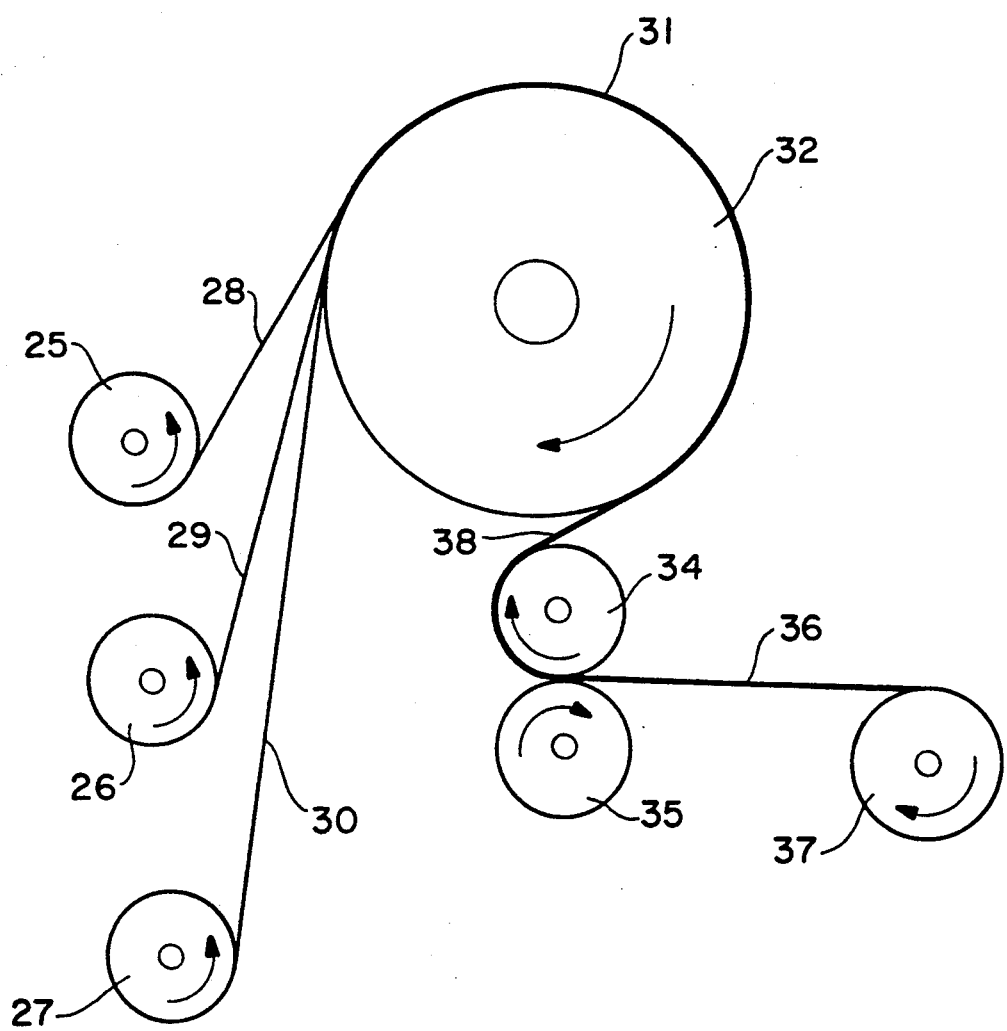
FIG. 2 shows an off-line method and apparatus for the manufacture of a flat, cloth-like composite laminate using a heated roll.

FIG. 2 shows an off-line method and apparatus for manufacturing a flat, cloth-like composite laminate according to the present invention when a heavier weight product is desired wherein the wetlaid bicomponent fiber layer 29 is unwound from a supply roll 26 and is inserted between two nonwoven layers of airlaid pulp 28 and 30 previously treated with a latex binder and unwound from supply rolls 25 and 27, respectively.

The nonwoven layers 28 and 30 and the bicomponent reinforcing layer 29, together forming the composite 31, are conveyed over a heated roll 32 and then through the nip of rubber roller 34 and a hot embossing roller 35 whereby the laminated structure is hot embossed by a pattern of point bonds to form the flat, cloth-like composite laminate of the present invention. The heated roll 32, such as for example a heated steam cylinder, is provided to activate the bicomponent reinforcing layer and the binder to bond the two nonwoven layers to opposite sides of the bicomponent reinforcing layer. The heated roll 32 has a temperature sufficient to activate the thermoplastic bicomponent reinforcing layer and is preferably within the range of 280° F. to 450° F.

If it is desired to enhance the bonding effect between the bicomponent reinforcing layer 29 and the nonwoven layers 28 and 30, an adhesive can be applied to both sides of the bicomponent layer or to the sides of the nonwoven layers which face the bicomponent layer, prior to heat treating the composite structure.

The composite 38, after passing over the heated roll 32, can also be pressed together by replacing rolls 34 and 35 with a pair of calender rolls. The nip pressure of the calender rolls is within the range of 100 pli to 300 pli. The temperature of the calender rolls is within the range of 280° F. to 450° F.

Preferably, one of the calender rolls is an electrically heated steel calender roll having a temperature of about 350° F. The other calender roll is a hard rubber roll having a rubber roll shore hardness of 80 to 100 durometers. The formed composite laminate 36 is then taken up on a supply roll 37 for storage until later use.

Figure 3:
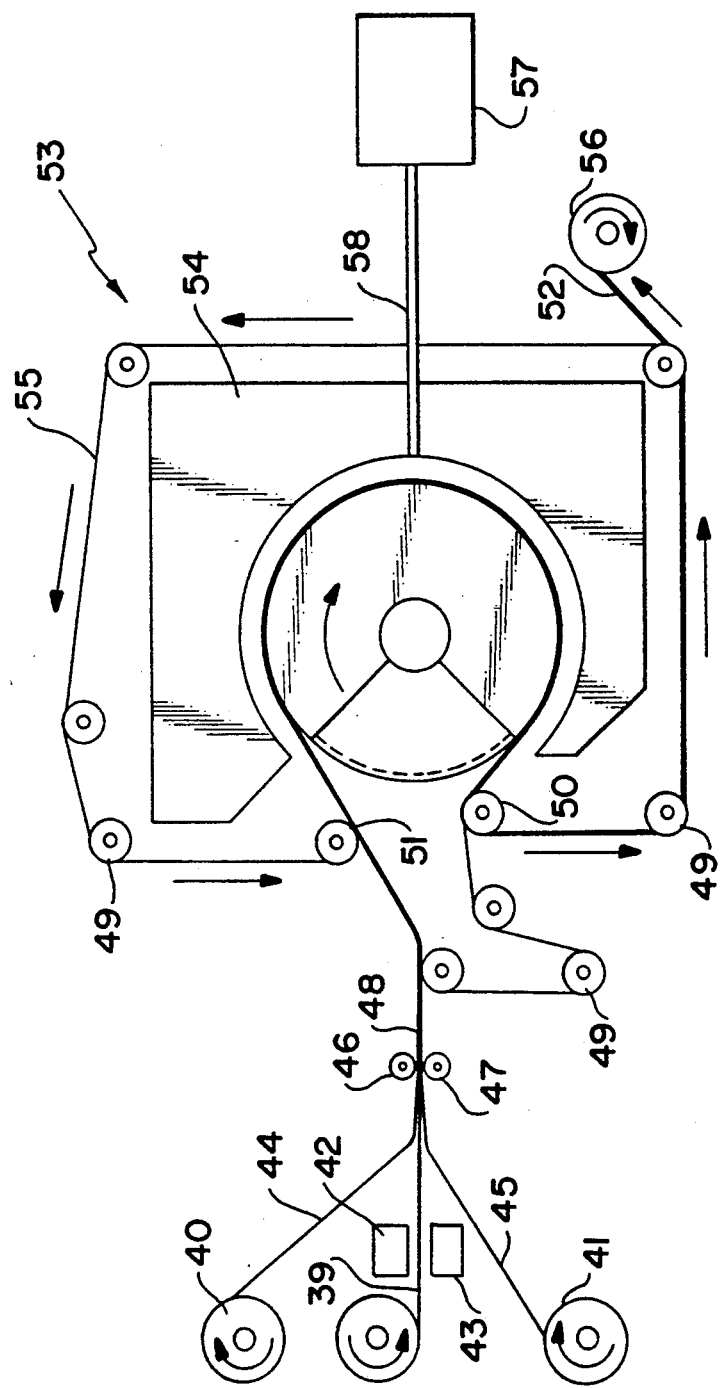
FIG. 3 shows a method and apparatus for manufacturing flat, cloth-like composite laminate of the present invention utilizing a rotary thru-air dryer rather than a heated drum for treating thick composites.

FIG. 3 shows a method and apparatus for manufacturing the flat, cloth-like composite laminate of the present invention utilizing a rotary thru-air dryer rather than a heated drum for treating thick composites. According to FIG. 3 airlaid cellulosic fiber layers, previously treated with a latex binder and dried to form two separate nonwoven layers 44 and 45 are unwound from rolls 40 and 41, respectively, and applied to both sides of a nonwoven bicomponent fiber web 39. Before being introduced, between the cellulosic fiber layers, the bicomponent fiber web is optionally preheated with heaters 42 and 43. The nonwoven cellulosic fiber layers 44 and 45 and the bicomponent fiber web 39 together form the composite 48 which is passed through a pair of rollers 46 and 47 into a lamination station 53.

In the lamination station 53, the composite 48 is guided by a restraining belt 55 and rollers 49 onto the circular carrying wires 51 which are positioned within a hood 54. Hot air 58, preferably at a temperature within the range of 220° to 410° F., is fed into the hood 54 from a hot air source 57 to activate the binder on the bicomponent fiber web 39. The hot air 58 is directed onto the composite 48 positioned on the circular carrying wires 51. The hot air causes the nonwoven cellulosic fiber layers and the nonwoven bicomponent fiber web to laminate together to form the composite laminate 52. The restraining belts 55 are maintained taut throughout the process, while the composite 48 is on the restraining belt 55 and being heated by the hot air 57, the layers 44, 39, 45 are not pressed together with excessive pressure.

While the composite 48 is on the restraining belt 55 and being heated by the hot air 58, the composite 48 is not pressed together. This absence of significant pressure on the composite layers during the heating step prevents both the bicomponent fiber web from interrupting the outer surface of the nonwoven layers and the migration of the thermoplastic sheath away from the bicomponent fiber web into the cellulosic fiber layers.

The formed composite laminate 52 exits from the hood 54 and passes over a cooling roll 50. The composite laminate is then taken up on supply roll 56, for storage until later use.

The airlaid three-dimensional cellulosic fibers are preferably wood pulp fibers and, most preferably, twisted wood pulp fibers. Preferably, the wood pulp fibers are chemically treated and predried to obtain a 90 to 95% solids content. Examples of wood pulp fibers include various mechanical and chemical pulp fibers, such as cedar fibers, southern pine fibers, spruce fibers, and hemlock fibers. Suitable three-dimensional and twisted fibers are prepared by several methods, such as those described in U.S. Pat. No. 4,036,679 to Back, U.S. Pat. No. 3,809,604 to Estes, and U.S. Pat. No. 3,756,913 to Wodka. The particular fibers used depend upon the type of texture, such as soft, wooly, or fluffy, that is desired. Suitable dimensions for the fibers include lengths of from 0.5 millimeters to 5 millimeters, and thicknesses of from 1 micron to 6 microns.

The weight of the cellulosic fibers forming each nonwoven layer is within the range of 20 pounds/ream to 50 pounds/ream. The separate layers containing the cellulosic fibers can be formed by air laying the cellulosic fibers onto various belts known in the art. One type of apparatus for air forming each layer of cellulosic fibers is shown in U.S. Pat. No. 4,292,271 to Buob et al.

The latex binder, used to bind together the three-dimensional cellulosic fibers in each nonwoven layer or used as the additional adhesive, can be selected from various latex adhesives known in the art. Acceptable latex adhesives include acrylate emulsions, butadiene-styrene emulsions, acetate-ethylene emulsions, and acrylonitrile-butadiene emulsions. An especially effective latex adhesive is acetate-ethylene, which is sold under the trademark AIRFLEX A-106 by Air Products, inc. of Penna.

The skilled artisan can select the particular latex adhesive depending upon the type of cellulosic fibers that are to be bound. The latex adhesive may be applied by known techniques such as spraying or foaming.

The amount of solids in the latex adhesive used depends, inter alia, on the weight of the cellulosic fibers in each layer. Generally, latex adhesives having from 15 to 25% solids are used.

As indicated above, the fibers of the wetlaid nonwoven web have a sheath-core configuration whereby the sheath member has a lower melting point than that of the core member. Typically both the sheath and core members are made of a thermoplastic synthetic material although it is possible for the sheath member to be made of a thermoplastic synthetic material and the core member to be made of a thermosetting synthetic material. It is also possible for the sheath member and the core member to be made of the same synthetic polymer such as polyethylene as long as the polymer which forms the sheath member has a lower melting point than the polymer which forms the core member.

Typical bicomponent fibers of the wetlaid nonwoven web may comprise a polyolefin sheath, for example polyethylene surrounding a polyester core such as for example polyethylene terephthalate. The polyethylene sheath has a melting point low enough so that the bicomponent fibers can be bonded to one another by passing the nonwoven web through the Yankee Dryer of a low speed paper machine. Another effective combination is a sheath member made of a polypropylene and a core member made of polyester.

The thermoplastic synthetic fibers which can be utilized for the sheath and core members of the present invention include those fibers which will melt or soften at a temperature below about 300° F. Typical thermoplastic synthetic fibers include present invention include those fibers which will melt or soften at a temperature below about 300° F. Typical thermoplastic synthetic fibers include polyolefins containing 1 to 8 carbon atoms, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton and the like.

The core member can also be made of a thermosetting resin such as phenol-formaldehyde, phenol furfural, urea-formaldehyde, melamine-formaldehyde, silicone rubber, and the like.

The sheath-core bicomponent wetlaid nonwoven web may also contain up to about 20% by weight, preferably about 5 to 10% by weight of wood pulp with the substantial balance being composed of the bicomponent fibers. A preferred mixture is about 90% by weight of the bicomponent fibers and about 10% by weight of the wood pulp. The use of the wood pulp reduces the overall cost of the final laminate product without materially affecting the physical properties thereof.

The following example is provided to illustrate the present invention but should not be considered in any way as limiting the scope of the present invention.

EXAMPLE

A wetlaid nonwoven reinforcing, fiber layer composed of 90% by weight of a sheath/core bicomponent fiber of polyethylene/polyethylene terephthalate and 10% by weight wood pulp at a basis weight of 3.5 to 11 pounds per ream is thermally bonded by running it over a Yankee Dryer of a low speed paper machine. The dryer is maintained at a temperature of 250° F. which is sufficient to satisfy the lower melting point of 263° C. of the polyethylene sheath of the bicomponent fiber. The physical properties of the thermally bonded wetlaid web of the present invention (JR 3276-2) is compared in the following table with the physical properties of a web made with fibers of two homopolymers, i.e. 85% by weight of polyethylene terephthalate and 15% by weight of 2 ethylene glycol terephthalic acid (Reemay 2250).

TABLE

Comparison of James River Thermal-Bond to Reemay

|  |  | Reemay 2250[1] | JR 3276-2[2] |
|---|---|---|---|
| Basis WT., lb/rm |  | 10.3 | 10.5 |
| Caliper, 8 ply mils |  | 4.3 | 4.6 |
| Bulk, cc/gram |  | 6.43 | 6.84 |
| Frazier Air Permeability, cfm |  | 921 | 697 |
| Elongation, % | MD | 28.2 | 18.1 |
|  | CD | 31.2 | 14.4 |
| Dry Tensile, g/3-inch | MD | 4529 | 5985 |
|  | CD | 3238 | 3958 |
|  | Mean | 3829 | 4867 |
| Wet Tensile, g/3-inch | MD | 5713 | 5248 |
|  | CD | 3149 | 4334 |
|  | Mean | 4241 | 4769 |
| Breaking Length, m | Dry | 2995 | 3741 |
|  | Wet | 3317 | 3666 |
| Tear, g | MD | 637 | 118 |
|  | CD | 717 | 123 |
| Mullen Burst, Dry Pts |  | 18.7 | 20.4 |

[1] two homopolymer fibers of 85% polyethylene terephthalate and 15% of 2 ethylene glycol-terephthalic acid
[2] 90% Bicomponent Celbond K-56 polyethylene/polyethylene terephthalate (PE/PET) sheath/core 2.0 d × 10 mm 10% Marathon OSWK wood pulp)

The comparison shown in the Table exemplifies the strength obtained by the resin to resin bonding which is effective in producing a very strong, most uniform, lightest weight bicomponent fiber web with the broadest possible versatility. Thus by using the prebonded wetlaid nonwoven bicomponent fiber, the resin to resin bond for maximizing the strength of the airlaid pulp, can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A flat, cloth-like composite laminate comprising:
   a wetlaid bicomponent fiber, nonwoven web layer, the bicomponent fiber layer includes a sheath-core configuration with the fiber component of the sheath member having a lower melting point than the fiber component of the core member, said fiber component of the sheath member and the fiber component of the core member is a material selected from the group consisting of the same thermoplastic synthetic material and distinct thermoplastic synthetic material;
   two nonwoven airlaid pulp web cellulosic fiber layers disposed on opposite sides of the bicomponent fiber, nonwoven web layer; and
   a latex adhesive for binding together the cellulosic fibers contained in each of said nonwoven airlaid pulp web layers to the fibers of said wetlaid bicomponent fiber, nonwoven web layer to form said composite structure.

2. A flat, cloth-like composite laminate comprising:
   a wetlaid bicomponent fiber, nonwoven web layer, the bicomponent fiber layer includes a sheath-core configuration with the fiber component of the sheath member having a lower melting point than the fiber component of the core member, said sheath member being a thermoplastic synthetic material and said core member being a thermoplastic synthetic material;
   two nonwoven airlaid pulp web cellulosic fiber layers disposed on opposite sides of the bicomponent fiber, nonwoven web layer; and
   a latex adhesive for binding together the cellulosic fibers contained in each of said nonwoven airlaid pulp web layers to the fibers of said wetlaid bicomponent fiber, nonwoven web layer to form said composite structure.

3. A flat, cloth-like composite laminate comprising:
a wetlaid bicomponent fiber, nonwoven web layer, the bicomponent fiber layer includes a sheath-core configuration with the fiber component of the sheath member having a lower melting point than the fiber component of the core member, said sheath member being a polyethylene and the core member being a polyester;
two nonwoven airlaid pulp web cellulosic fiber layers disposed on opposite sides of the bicomponent fiber, nonwoven web layer; and
a latex adhesive for binding together the cellulosic fibers contained in each of said nonwoven airlaid pulp web layers to the fibers of said wetlaid bicomponent fiber, nonwoven web layer to form said composite structure.

4. A flat, cloth-like composite laminate comprising:
a wetlaid bicomponent fiber, nonwoven web layer, the bicomponent fiber layer includes a sheath-core configuration with the fiber component of the sheath member having a lower melting point than the fiber component of the core member, said sheath member being a polyethylene and the core member being a polypropylene;
two nonwoven airlaid pulp web cellulosic fiber layers disposed on opposite sides of the bicomponent fiber, nonwoven web layer; and
a latex adhesive for binding together the cellulosic fibers contained in each of said nonwoven airlaid pulp web layers to the fibers of said wetlaid bicomponent fiber, nonwoven web layer to form said composite structure.

5. A flat, cloth-like composite laminate comprising:
a wetlaid bicomponent fiber, nonwoven web layer, the bicomponent fiber layer includes a sheath-core configuration with the fiber component of the sheath member being a low melting point polyester and the fiber component of the core member being a high melting point polyester;
two nonwoven airlaid pulp web cellulosic fiber layers disposed on opposite sides of the bicomponent fiber, nonwoven web layer; and
a latex adhesive for binding together the cellulosic fibers contained in each of said nonwoven airlaid pulp web layers to the fibers of said wetlaid bicomponent fiber, nonwoven web layer to form said composite structure.

6. A flat, cloth-like composite laminate comprising:
a wetlaid bicomponent fiber, nonwoven web layer, the bicomponent fiber layer includes a sheath-core configuration with the fiber component of the sheath member having a lower melting point than the fiber component of the core member, the bicomponent fiber nonwoven web is present in said layer in an amount up to 95% by weight with the substantial balance being wood pulp;
two nonwoven airlaid pulp web cellulosic fiber layers disposed on opposite sides of the bicomponent fiber, nonwoven web layer; and
a latex adhesive for binding together the cellulosic fibers contained in each of said nonwoven airlaid pulp web layers to the fibers of said wetlaid bicomponent fiber, nonwoven web layer to form said composite structure.

7. The composite laminate according to claim 6, wherein said core member is a thermosetting resin.

8. A flat, cloth-like composite laminate comprising:
a wetlaid bicomponent fiber, nonwoven web layer, the bicomponent fiber layer includes a sheath-core configuration with the fiber component of the sheath member having a lower melting point than the fiber component of the core member, said fiber component of the sheath member and the fiber component of the core member is a material selected from the group consisting of the same thermoplastic synthetic material and distinct thermoplastic synthetic material; and
two nonwoven airlaid pulp web cellulosic fiber layers disposed on opposite sides of the bicomponent fiber, nonwoven web layer;
said layers being bonded together by fusion bonding of the fibers contained in each of said nonwoven airlaid pulp web layers to the fibers of said wetlaid bicomponent fiber, nonwoven web layer to form said composite structure.

9. The flat, cloth-like composite laminate according to claim 8, wherein a hot embossing pattern is applied to said composite structure.

10. A flat, cloth-like composite laminate comprising:
a wetlaid bicomponent fiber, nonwoven web layer, the bicomponent fiber layer includes a sheath-core configuration with the fiber component of the sheath member having a lower melting point than the fiber component of the core member, said sheath member being a thermoplastic synthetic material and said core member being a thermoplastic synthetic material; and
two nonwoven airlaid pulp web cellulosic fiber layers disposed on opposite sides of the bicomponent fiber, nonwoven web layer;
said layers being bonded together by fusion bonding of the fibers contained in each of said nonwoven airlaid pulp web layers to the fibers of said wetlaid bicomponent fiber, nonwoven web layer to form said composite structure.

11. The flat, cloth-like composite laminate according to claim 10, wherein a hot embossing pattern is applied to said composite structure.

12. A flat, cloth-like composite laminate comprising:
a wetlaid bicomponent fiber, nonwoven web layer, the bicomponent fiber layer includes a sheath-core configuration with the fiber component of the sheath member having a lower melting point than the fiber component of the core member, said sheath member being a polyethylene and the core member being a polyester; and
two nonwoven airlaid pulp web cellulosic fiber layers disposed on opposite sides of the bicomponent fiber, nonwoven web layer;
said layers being bonded together by fusion bonding of the fibers contained in each of said nonwoven airlaid pulp web layers to the fibers of said wetlaid bicomponent fiber, nonwoven web layer to form said composite structure.

13. The flat, cloth-like composite laminate according to claim 12, wherein a hot embossing pattern is applied to said composite structure.

14. A flat, cloth-like composite laminate comprising:
a wetlaid bicomponent fiber, nonwoven web layer, the bicomponent fiber layer includes a sheath-core configuration with the fiber component of the sheath member having a lower melting point than the fiber component of the core member, said sheath member being a polyethylene and the core member being a polypropylene; and two nonwoven airlaid pulp web cellulosic fiber layers disposed on opposite sides of the bicomponent fiber, nonwoven web layer;

said layers being bonded together by fusion bonding of the fibers contained in each of said nonwoven airlaid pulp web layers to the fibers of said wetlaid bicomponent fiber, nonwoven web layer to form said composite structure.

15. The flat, cloth-like composite laminate according to claim 14, wherein a hot embossing pattern is applied to said composite structure.

16. A flat, cloth-like composite laminate comprising:
   a wetlaid bicomponent fiber, nonwoven web layer, the bicomponent fiber layer includes a sheath-core configuration with the fiber component of the sheath member being a low melting point polyester and the fiber component of the core member being a high melting point polyester; and
   two nonwoven airlaid pulp web cellulosic fiber layers disposed on opposite sides of the bicomponent fiber, nonwoven web layer;

said layers being bonded together by fusion bonding of the fibers contained in each of said nonwoven airlaid pulp web layers to the fibers of said wetlaid bicomponent fiber, nonwoven web layer to form said composite structure.

17. The flat, cloth-like composite laminate according to claim 16, wherein a hot embossing pattern is applied to said composite structure.

18. A flat, cloth-like composite laminate comprising:
   a wetlaid bicomponent fiber, nonwoven web layer, the bicomponent fiber layer includes a sheath-core configuration with the fiber component of the sheath member having a lower melting point than the fiber component of the core member, the bicomponent fiber nonwoven web is present in said layer in an amount up to 95% by weight with the substantial balance being wood pulp; and
   two nonwoven airlaid pulp web cellulosic fiber layers disposed on opposite sides of the bicomponent fiber, nonwoven web layer;

said layers being bonded together by fusion bonding of the fibers contained in each of said nonwoven airlaid pulp web layers to the fibers of said wetlaid bicomponent fiber, nonwoven web layer to form said composite structure.

19. The flat, cloth-like composite laminate according to claim 18, wherein a hot embossing pattern is applied to said composite structure.

20. The composite laminate according to claim 18, wherein said core member is a thermosetting resin.

* * * * *